United States Patent [19]
Autermann et al.

[11] Patent Number: 5,889,671
[45] Date of Patent: Mar. 30, 1999

[54] MOBILE ON-BOARD COMPUTER SYSTEM WITH OPERATION UNITS FOR MACHINES

[75] Inventors: Ludger Autermann, Drensteinfurt; Klaus Kollmeier, Münster; Thilo Steckel, Harsewinkel; Klaudia Klasbrummel, Verl; Kai Oetzel, Werther; Hans-Herrmann Wippersteg, Bünde; Stefan Böttinger, Bielefeld; Ernst Josef Schligten, Beelen, all of Germany

[73] Assignee: Claas KGaA, Harsewinkel, Germany

[21] Appl. No.: 877,043

[22] Filed: Jun. 17, 1997

[30] Foreign Application Priority Data

Jun. 17, 1996 [DE] Germany ............... 196 24 027.1

[51] Int. Cl.⁶ .............. G05B 11/00; G06F 1/16; H05K 5/00
[52] U.S. Cl. ............ 364/188; 364/708.1; 701/50; 361/724
[58] Field of Search ................. 364/188, 708.1; 701/50; 361/724, 728, 729, 730; 248/917, 919

[56] References Cited

U.S. PATENT DOCUMENTS

| | | | |
|---|---|---|---|
| 4,684,089 | 8/1987 | van der Lely | 248/124 |
| 4,733,838 | 3/1988 | van der Lely | 248/124 |
| 5,566,069 | 10/1996 | Clark, Jr. et al. | 364/420 |
| 5,668,977 | 9/1997 | Swanstrom et al. | 395/500 |
| 5,712,782 | 1/1998 | Weigelt et al. | 364/424.07 |

FOREIGN PATENT DOCUMENTS

| | | |
|---|---|---|
| 0 674 255 A1 | 9/1995 | France . |
| 2 723 792 | 2/1996 | France . |
| 36 12 767.1 | 10/1987 | Germany . |
| 40 16 603.1 | 11/1991 | Germany . |
| 42 20 051.2 | 12/1993 | Germany . |
| 0 666 198 A1 | 12/1994 | Germany . |
| 195 05 845.3 | 9/1995 | Germany . |
| P-1566 | 6/1993 | Japan . |
| 7-129 204 A | 5/1995 | Japan . |
| WO 95/13577 | 5/1995 | WIPO . |

*Primary Examiner*—Paul P. Gordon
*Attorney, Agent, or Firm*—Michael J. Striker

[57] ABSTRACT

An on-board computer system for machines has comprising a computer unit, a plurality of operation units for the machines such that the machines are adjustable, controllable and regulatable through the computer unit by adjusting values stored or inputted in the computer unit, inputting means for completing and changing data stored in said computer unit, an exchangeable operator plate having indicating and inputting means, and a mobile case accommodating the computer unit and formed so that the mobile sleeve is releasably connectable with the working machine and mountable on different working machines.

36 Claims, 2 Drawing Sheets

MOBILE ON-BOARD COMPUTER SYSTEM WITH OPERATION UNITS FOR MACHINES

BACKGROUND OF THE INVENTION

The present invention relates to an mobile on-board computer system with operation units for machines.

More particularly, it relates to such a on-board computer, through which the machine can be adjusted, controlled and/or regulated by adjustment values which are stored and/or inputted in the on-board computer system, and the data stored in the on-board computer system are completable or changeable by input devices, as well as provided with an exchangeable operation plate, the indicating devices and the inputting devices.

On-board computer system of this type is disclosed for example in the German patent document DE 40 16 603. Such an on-board computer system provides an improved regulation and control of the machine equipped with it. It has however the advantage that it is relatively expensive. Since in addition a plurality of machines can be available, for example in the agriculture, it is necessary to provide for control and regulation of machine components at least partially similarly built hardware and software. Therefore, in a mass production when it is necessary to equip the machines with the on-board computer systems the situation occurs that the machine user is forced to purchase for each individual machine new corresponding hardware and software with the machine. Under certain conditions however, it does not use all machines and thereby invests in capacities which it does not need under the circumstances. The German document DE 36 12 767 it is proposed to provide an operation surface for an on-board computer system with a quickly releasable connection to the neighboring components. However, only one exchangeable operation surface can not lead to a substantial cost reduction of the machine user, since many machine-specific hardware and software components remain on a machine.

SUMMARY OF THE INVENTION

Accordingly, it is an object of present invention to provide a board computer system, which avoids the disadvantages of the prior art.

More particularly, it is an object of the present invention to provide an on-board computer system which can be used for a plurality of machines and thereby reduces the cost for a machine user.

In keeping with these objects and with others which will become apparent hereinafter, one feature of present invention, resides, briefly stated in an on-board computer system which is built in a mobile case, the mobile case is releasably connected with the machine, and the mobile case is mountable on different machines.

Due to the inventive arrangement of an on-board computer system, it can be easily dismounted from one machine and mounted on another machine, for example from a field tractor to a telescopable loader, and from there on a ground car, in an office and also for control process on the field in a holding belt. Thereby, a complete on-board computer system, including a central computer unit with operation and indication part and eventually with associated software and also possibly with other joystick, a multifunction handle or a keyboard. With such external operation units, the operation possibilities can be expanded with the degree possible by the on-board computer system mounted in the mobile case.

With an intelligence software between the external operation unit and the on-board computer system, it is possible that for example the operation functions of the external operation unit can be learned or an active acknowledgment of the condition of a connected machine unit is provided. Generally, the mobile case must be so formed that additional units can be set in, set on, and removed modularly with a lowest possible expanse. Due to the modular construction, it is possible to use expensive board computer units, such as for example an on-board computer equipped with a navigation system, on different machines, with which the navigation function is needed. For this purpose, either the complete mobile case is exchanged, or the navigation module is inserted into the mobile case of the other machine. Such an exchange is possible naturally also with or because different module structural block.

Preferably, the on-board computer system in the mobile case is mounted on a docking station which is fixedly connected with the machine. The docking station can be fixedly connected with the machine through an additional holder. An insertion or adjusting compartment can be provided on the machine, in which the mobile case is insertable or setable in. The connections between the board computer system and the machine are produced by plug contacts which are located on the mobile case on the one hand and the docking station or the insertion or setting-in compartment on the other hand. During insertion or setting in of the mobile case in the working position, they are connectable with one another. The docking station can contain further components such as a connecting unit, for example RAM and/or ROM memory, plug contacts for the machine mounting, electronic means for determination and evaluation of electrical signals, warning horns, a printer, standard interfaces or also mounting possibilities for a hand scanner. Also, in an EEPROM or EPROM arranged in the docking station, a shortened machine identification for certain calibration values, adjustment values etc. can be stored. In addition the mobile case with the board computer and eventually further modules can be available through standard interfaces and connection plugs for connection of further devices to the on-board computer or the additional module.

The versatile ability of the on-board computer system mountable in a mobile case is possible by representing on the indication devices of the on-board computer system at least partially indication images which contain the specific elements of the machine with which the on-board computer system is actually connected. In addition to a neutral design of the operation elements of the on-board computer system, the machine-individual functionality is also obtained by at least partially machine-specific indication images. Individual or several operational conditions of the machine to be controlled by the on-board computer as a whole or in components can be graphically represented on at least one indicating device of the on-board computer system so that, for example through pictogram or an image representation of the machine, the operational or switching condition is optically recognizable.

In order to make available the respective indication image, one or several indication images on an indication device of the on-board computer system can be stored in a terminal, and can be selected through an indication manual or communication of the on-board computer system with the docking station or the electronic system of the machine. It is also possible, instead or additionally, to store one or several indication images of an indicating device of the on-board computer system in the docking station or on another point of the machine, and load the same through an automated or manual-guided communication of the on-board computer system with the docking station or subsequent electronic elements of the machine after docking in the working memory of the on-board computer system. In order to ensure a correct statement of the indication image, the on-board computer system compares the actual statement value of one or several indication images of an indicating device of an on-board computer system with the corresponding actual condition of the indicating function of the machine through a data bus system and corrects the deviations between the statement value of the indication image and the actual condition of the indicated function of the statement value of the indicating image. Such a comparison can be performed by suitable software which evaluates the signals of a corresponding sensor system.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
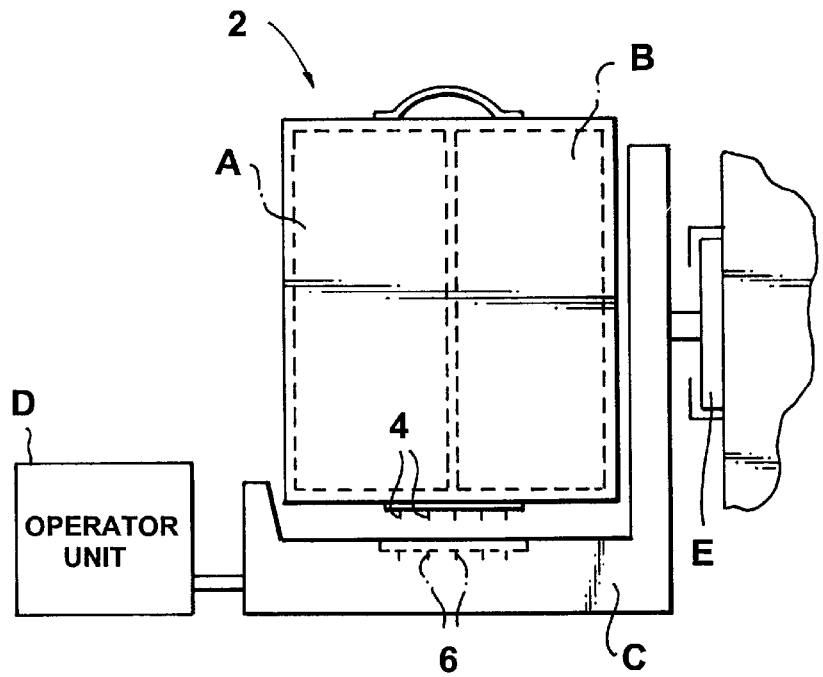
FIG. 1 is a view schematically showing a cross-section through an on-board computer in accordance with present invention, in a mobile case.

FIG. 1 schematically shows a construction of an inventive on-board computer system. A computer unit A and a communication unit B are arranged in a mobile case 2. A plug 4 is located on the lower side of the mobile case 2. It must be plugged into a plug 6 located on a docking station C, to establish a connection between the mobile case 2 and the docking station C. The docking station C is connected with a vehicle holder E. Additionally an operator unit D can be connected in the docking station C to the mobile case 2, the computer unit A and the communication unit B, depending on which function the operator unit D has and on which module it must be connected.

Figure 2:
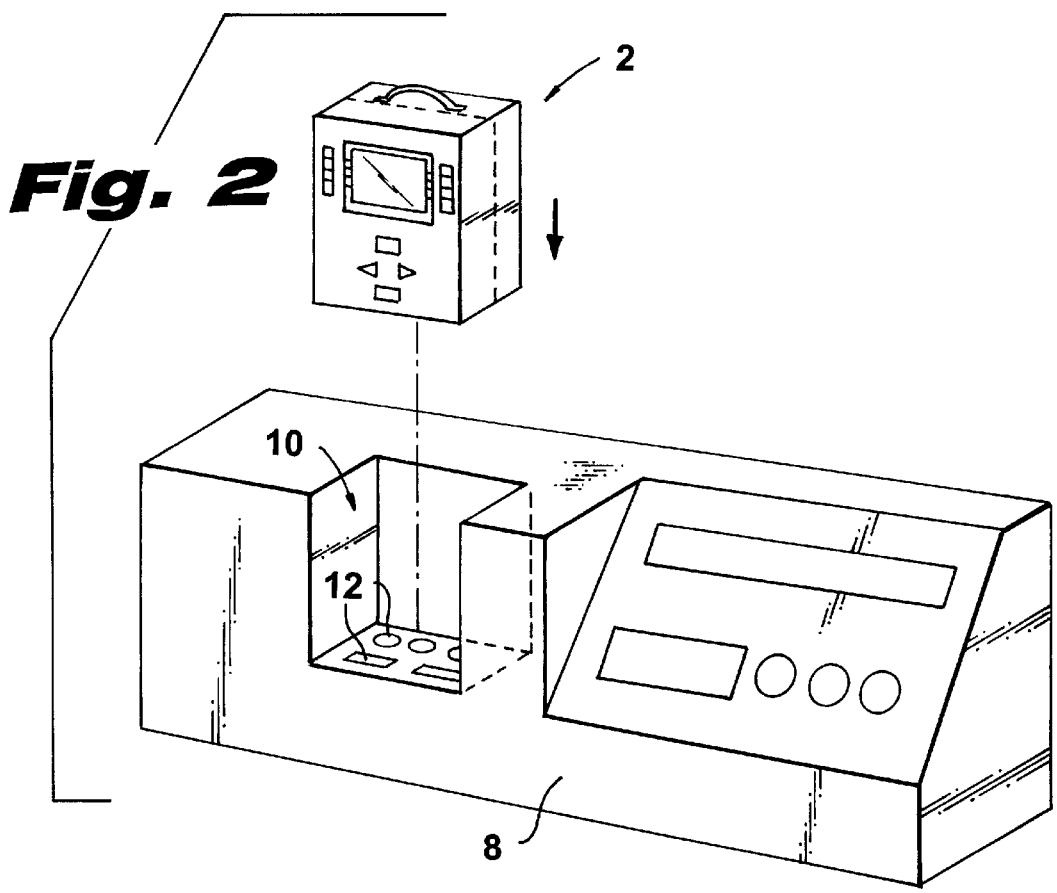
FIG. 2 is a view schematically showing a mounting situation in a machine with a setting-in compartment.

An operator console 8 is shown in FIG. 2 and accommodates a setting-in compartment 10 which substantially corresponds to the size of the mobile case of the on-board computer system. The operator console 8 can be provided on a harvester thresher, a tractor, or another machine. A connection socket is identified with reference numeral 12, and a corresponding counter element is located on the lower side of the mobile case 2 of the on-board computer system. During setting in of the mobile case 2 into the setting in compartment 10 an operational communication between these two elements is provided. For preventing a situation that during strong machine vibrations, driving over potholes or other deleterious conditions, the operative communication is lost, it is proposed for the mobile case 2 to provide a clamping mounting or a similar device which prevents an unauthorized loosening of the connection of the plug contacts.

Figure 3:
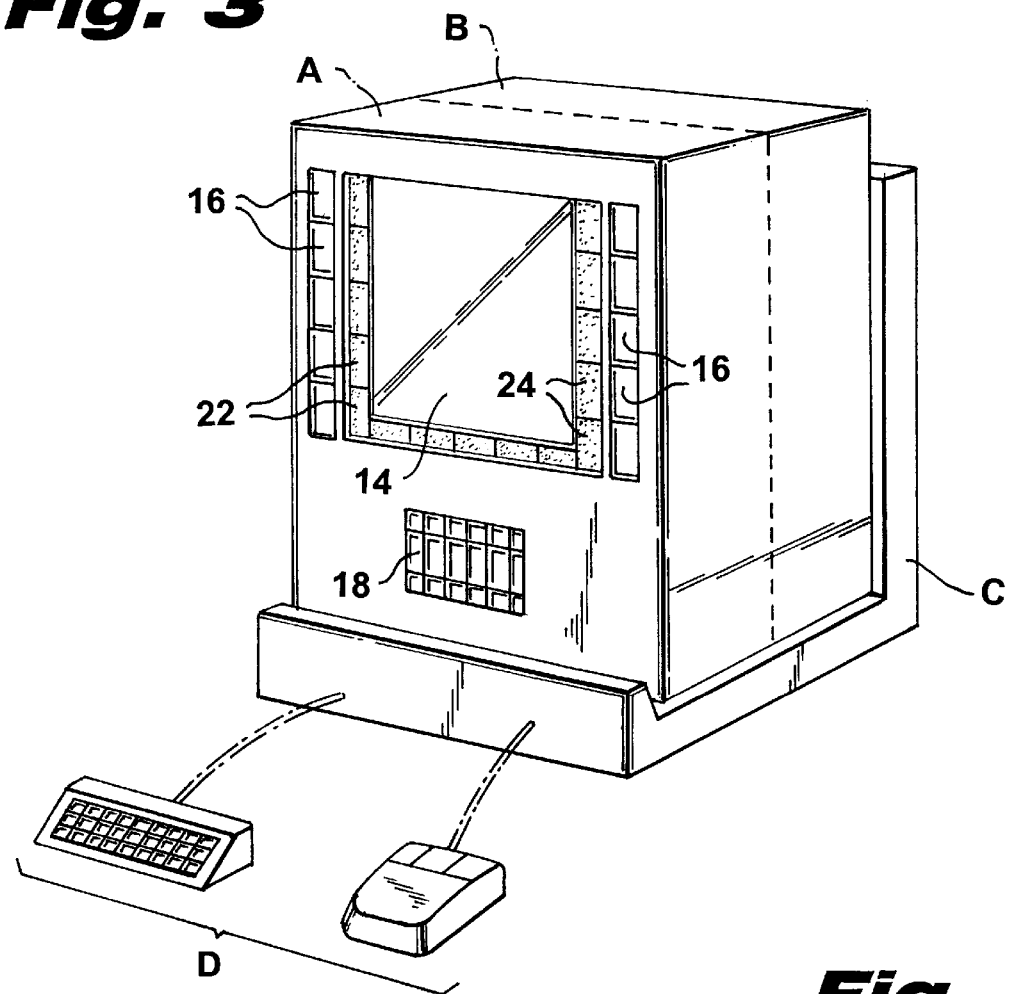
FIG. 3 is a view showing a possible operation surface of an on-board computer in a mobile case.

FIG. 3 shows a possible operation surface of a computer unit A with operation and indication devices in the mobile case 2 which is assembled with a communication unit B and plugged on the docking station C. Near an image screen 14, operation keys 16 are located. They usually correspond to an indication field of the flat image screen 14 and switch a function of a corresponding machine associated with an operation key on the flat image screen in the indication image. The operation field 18 has keys which can be used by a machine user for manual guidance in the indication image of the flat image screen 14 and for inputting of commands or data. The operation surface is maintained general and does not contain machine-specific marking of the keyboard. The machine-specific operation surfaces produce in cooperation with the neutral keyboard the operation surface with the machine-specific indication images of the flat image screen 14.

Figure 4:
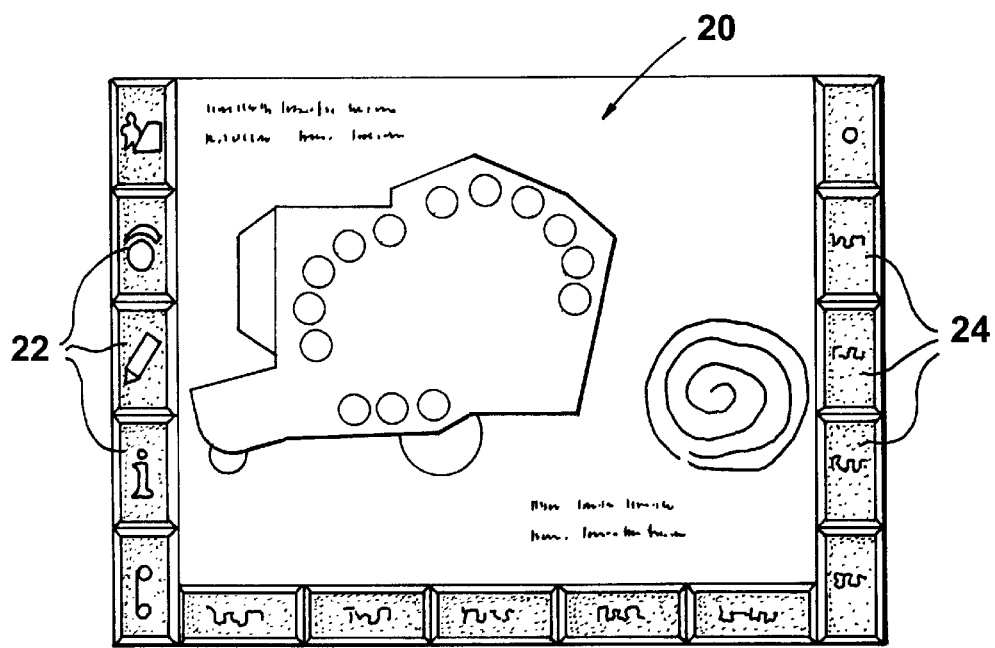
FIG. 4 is a view showing an example for an operation image on an indication monitor of the on-board computer system in accordance with present invention.

FIG. 4 shows an exemplary machine-specific indication image of the flat image screen 14. The indication image 20 illustrates a round baler 26 with an already ejected round bail 28, which is controlled actually by the on-board computer system. On the left side of the indication image 28 a symbolic representation 22 identifying the predetermined manual commands are presented. By actuation of keys 16 of the operation field located near the corresponding symbol commands the commands are executed by the software and new manual images are generated. At the right side of the indication image 20 symbolic representation 24 are provided. By actuation of keys 16 of the operation field adjoining the corresponding symbol fields, the symbolically illustrated functions of the machine can be turned on or turned off, such as for example the cutting device of the round baler, the yarn or net binding, the bale ejection or other functions. On other locations of the indicating image, order data, customer data, rotary speeds, speeds, time, oil and hydraulic pressure, warning symbols or other indicating elements can be represented.

The shown indication image 20 is of course exemplary and can be selected completely different with different symbols and special arrangement. In addition to the pure machine functions, the indication devices of an on-board computer system can also indicate machine-independent data, such as for example when the on-board computer system is formed as a laptop with a text processing, table calculation and graphic, and an indicating device operates as an image screen for the laptop or when through the indicating device the course of the communication unit B with external communication partners or communicated data files are indicated.

It will be understood that each of the elements described above, or two or more together, may also find a useful application in other types of constructions differing from the types described above.

While the invention has been illustrated and described as embodied in mobile on-board computer system with operation units for machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An on-board computer system for machines, comprising a computer unit operative for adjustment, control and regulation; a plurality of operation units for the machines such that the machines are adjustable, controllable and regulatable through said computer unit by adjusting values stored or inputted in said computer unit; inputting means for completing and changing data stored in said computer unit; an exchangeable operator plate having indicating and inputting means; a mobile case accommodating said computer unit and formed so that said mobile case is releasably connectable with the working machine and mountable on different working machines for providing the adjustment, control and regulation of the different working machines.

2. An on-board computer system as defined in claim 1; and further comprising a flat image screen forming said indicating means.

3. An on-board computer system as defined in claim 1, wherein said computer unit has an operator and indicator part accommodated in said mobile case.

4. An on-board computer system as defined in claim 3, wherein said computer unit is also provided with at least one communication unit, navigation unit, position means unit and data storage unit all accommodated in said mobile case.

5. An on-board computer system as defined in claim 1, wherein said computer unit is provided with at least one navigation unit also accommodated in said mobile case.

6. An on-board computer system as defined in claim 1, wherein said computer unit is provided with at least one positioning means unit also accommodated in said mobile case.

7. An on-board computer system as defined in claim 1, wherein said computer unit is provided with at least one data storage unit also accommodated in said mobile case.

8. An on-board computer system as defined in claim 1, wherein said computer unit is provided additionally with at least one communication unit also accommodated in said mobile case.

9. An on-board computer system as defined in claim 1; and further comprising at least one external operation unit connected with said computer unit.

10. An on-board computer system as defined in claim 1, wherein said mobile case is formed so that additional units are modularly insertable into said mobile case.

11. An on-board computer system as defined in claim 1, wherein said mobile case is formed so that additional units are modularly mounted on said mobile case.

12. An on-board computer system as defined in claim 1, wherein said mobile case is formed so that additional units are modularly dismounted from said mobile case.

13. An on-board computer system as defined in claim 1; and further comprising a docking station fixedly connectable with the machine, said computer unit and said mobile case being mountable on said docking station.

14. An on-board computer system as defined in claim 1; and further comprising an insertion compartment provided on the working machine and formed so that said mobile case is insertable into said insertion unit.

15. An on-board computer system as defined in claim 1; and further comprising a setting-in compartment provided on the working machine and formed so that said mobile case is settable in said setting-in compartment.

16. An on-board computer system as defined in claim 1; and further comprising plug means including a first plug element arranged on said mobile case and a second plug element associated with the machine and connectable with said first plug element.

17. An on-board computer system as defined in claim 16; and further comprising a docking station provided on the machine, said second plug element being arranged on said docking station so that by placing said mobile case in a working position said first plug element is connected with said second plug element on said docking station.

18. An on-board computer system as defined in claim 16; and further comprising a insertion compartment provided on the machine, said second plug element being arranged on said insertion compartment so that by placing said mobile sleeve in a working position said first plug element is connected with said second plug element on said insertion compartment.

19. An on-board computer system as defined in claim 1, wherein said mobile case with said computer means is formed so that said mobile case is connectable with a standard interface and a connection plug to a further device.

20. An on-board computer system for machines, comprising a computer unit; a plurality of operation units for the machines such that the machines are adjustable, controllable and regulatable through said computer unit by adjusting values stored or inputted in said computer unit; inputting means for completing and changing data stored in said computer unit; an exchangeable operator plate having indicating and inputting means; a mobile case accommodating said computer unit and formed so that said mobile case is releasably connectable with the working machine and mountable on different working machines; a docking station fixedly connectable with the machine, said computer unit and said mobile case being mountable on said docking station; and an additional holder through which said docking station is fixedly connectable with the machine.

21. An on-board computer system for machines, comprising a computer unit; a plurality of operation units for the machines such that the machines are adjustable, controllable and regulatable through said computer unit by adjusting values stored or inputted in said computer unit; inputting means for completing and changing data stored in said computer unit; an exchangeable operator plate having indicating and inputting means; a mobile case accommodating said computer unit and formed so that said mobile case is releasably connectable with the working machine and mountable on different working machines, said mobile case being formed so that additional units are modularly dismounted from said mobile case, said docking station being available through a memory whose content is made ready at least partially for transmission to said computer unit after mounting of said mobile case.

22. An on-board computer system as defined in claim 21, wherein said docking station detects and evaluates electrical signals.

23. An on-board computer system for machines, comprising a computer unit; a plurality of operation units for the machines such that the machines are adjustable, controllable and regulatable through said computer unit by adjusting values stored or inputted in said computer unit; inputting means for completing and changing data stored in said computer unit; an exchangeable operator plate having indicating and inputting means; a mobile case accommodating said computer unit and formed so that said mobile case is releasably connectable with the working machine and mountable on different working machines, said indicating means including at least one indicating device having at least partially an indication image which contains specific elements of a corresponding machine with which computer unit is connected.

24. An on-board computer system as defined in claim 23, wherein said indicating device graphically illustrates operational conditions of the machine to be controlled by said computer unit so that a condition selected from the group consisting of an operation condition or switching condition is optically recognizable.

25. An on-board computer system as defined in claim 23, wherein the operation conditions are illustrated graphically as a whole.

26. An on-board computer system as defined in claim 23, wherein the operation conditions are illustrated as graphically structural groups.

27. An on-board computer system as defined in claim 23; and further comprising a terminal in which the indicating images of said indicating device are stored; an electrical means associated with the working machine and selecting the indicating images through intermediate means.

28. An on-board computer system as defined in claim 27, wherein said intermediate means is an indicating menu.

29. An on-board computer system as defined in claim 27, wherein said intermediate means is a communication of said indicating device with said computer unit.

30. An on-board computer system as defined in claim 27, wherein said electronic means is provided in the machine.

31. An on-board computer system as defined in claim 27; and further comprising a docking station associated with the working machine and provided with said electronic means.

32. An on-board computer system for machines, comprising a computer unit; a plurality of operation units for the machines such that the machines are adjustable, controllable and regulatable through said computer unit by adjusting values stored or inputted in said computer unit; inputting means for completing and changing data stored in said computer unit; an exchangeable operator plate having indicating and inputting means; a mobile case accommodating said computer unit and formed so that said mobile case is releasably connectable with the working machine and mountable on different working machines; means for storing at least one indicating image of said indicating means; and an operation memory in which said at lest one indicating image is loaded through intermediate means after docking, so that said at least one indicating image is loaded in said operation storage through said communication with said docking station.

33. An on-board computer system as defined in claim 32; and further comprising a docking station provided on the machine and forming said storing means, said intermediate means being means for communication of said computer unit with said docking station so that at least one indicating image is loaded through said electronic elements of the machine in the operation memory.

34. An on-board computer system as defined in claim 32, wherein said storing means is means at a location of the machine, said intermediate means being electronic elements provided on the machine.

35. An on-board computer system for machines, comprising a computer unit; a plurality of operation units for the machines such that the machines are adjustable, controllable and regulatable through said computer unit by adjusting values stored or inputted in said computer unit; inputting means for completing and changing data stored in said computer unit; an exchangeable operator plate having indicating and inputting means; a mobile case accommodating said computer unit and formed so that said mobile case is releasably connectable with the working machine and mountable on different working machines; a data bus system through which said computer unit compares a statement value of at least one indicating image of said indicating means with an actual condition of an indicating function of the machine; and means for correcting the statement value of the indicating image in the event of a deviation between the statement value of the at least one indicating image and the actual condition of the indicated function.

36. A machine system, comprising a working machine for performing machine functions; and an on-board computer system for said machine system and including a computer unit; a plurality of operation units for the machine such that the machine is adjustable, controllable and regulatable through said computer unit by adjusting values stored or inputted in said computer unit; inputting means for completing and changing data stored in said computer unit; an exchangeable operator plate having indicating and inputting means; a mobile case accommodating said computer unit and formed so that said mobile case is releasably connectable with the working machine and mountable on different working machines for providing the adjustment, control and regulation of the different working machines.

* * * * *